US012703355B2

(12) United States Patent
Kim

(10) Patent No.: US 12,703,355 B2
(45) Date of Patent: Aug. 11, 2026

(54) METHOD AND DEVICE FOR PREDICTING PATH OF SURROUNDING OBJECT

(71) Applicant: HL Klemove Corp., Incheon (KR)

(72) Inventor: Inhan Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 108 days.

(21) Appl. No.: 18/386,740

(22) Filed: Nov. 3, 2023

(65) Prior Publication Data

US 2024/0383473 A1 Nov. 21, 2024

(30) Foreign Application Priority Data

May 17, 2023 (KR) ........................ 10-2023-0063618

(51) Int. Cl.
*B60W 30/095* (2012.01)

(52) U.S. Cl.
CPC . *B60W 30/0956* (2013.01); *B60W 2554/4029* (2020.02); *B60W 2554/4042* (2020.02); *B60W 2556/40* (2020.02)

(58) Field of Classification Search
CPC .... B60W 30/08; B60W 30/09; B60W 30/095; B60W 30/0953; B60W 30/0956; B60W 40/02; B60W 50/0097; B60W 60/0027; B60W 60/00272; B60W 60/00274; B60W 60/0053; B60W 2420/403; B60W 2420/408; B60W 2554/40; B60W 2554/4029; B60W 2554/4042; B60W 2554/4045; B60W 2556/40; G06N 20/00
See application file for complete search history.

(56) References Cited

U.S. PATENT DOCUMENTS

| | | | | |
|---|---|---|---|---|
| 2020/0023842 | A1* | 1/2020 | Gutierrez | G06V 20/58 |
| 2021/0312811 | A1* | 10/2021 | Ohlarik | G08G 1/20 |
| 2022/0363256 | A1* | 11/2022 | Dax | B60W 40/105 |
| 2022/0396290 | A1* | 12/2022 | Oh | B60W 60/0015 |
| 2024/0092357 | A1* | 3/2024 | Kobilarov | B60W 30/0956 |
| 2024/0157973 | A1* | 5/2024 | Pini | B60W 50/0097 |
| 2024/0217548 | A1* | 7/2024 | Pronovost | G06N 20/00 |
| 2024/0354601 | A1* | 10/2024 | Keller | G06N 7/01 |
| 2025/0145179 | A1* | 5/2025 | Knittel | B60W 60/0027 |

* cited by examiner

*Primary Examiner* — Brandon Z Willis
(74) *Attorney, Agent, or Firm* — Hauptman Ham, LLP

(57) ABSTRACT

A method predicting a path of an object includes: recognizing the object by using at least one sensor of the vehicle; generating movement path data associated with the object by tracking a movement path of the object during a first time interval when the object is recognized; and generating prediction path data including at least one prediction path associated with the object during a second time interval based on the generated movement path data.

12 Claims, 7 Drawing Sheets

METHOD AND DEVICE FOR PREDICTING PATH OF SURROUNDING OBJECT

CROSS-REFERENCE TO RELATED APPLICATION

This application claims priority under 35 U.S.C. § 119 to Korean Patent Application No. 10-2023-0063618, filed on May 17, 2023, in the Korean Intellectual Property Office (KIPO), the disclosure of which is incorporated by reference herein in its entirety.

TECHNICAL FIELD

The present disclosure relates to a method and a device for predicting a path of an object in the surroundings of a vehicle, and particularly, to a method and a device for predicting a path to avoid a collision by predicting the path of the object.

BACKGROUND

In recent years, with the development of autonomous driving technology, an Advanced Driver Assistance System (ADAS) for enhancing a safety of a driver is used. For example, the ADAS can include an emergency braking system that autonomously controls a speed even if the driver does not step on a braking device when there is a danger of a collision, and a steering assistance system that maintains a lane by adjusting a driving direction when the lane departures.

On the other hand, it is possible for autonomous driving technologies, such as the current ADAS, to drive a vehicle by avoiding static obstacles, but it is difficult to recognize and avoid abnormal dynamic obstacles. In addition, even if the dynamic obstacle is recognized, it is not easy to accurately predict a future movement path of the dynamic obstacle to determine the possibility of a collision with the vehicle.

SUMMARY

In view of the above, the present disclosure provides a method for predicting a path of an object in surroundings of a vehicle, a computer program stored in a computer-readable storage medium, and a computer-readable storage medium storing the computer program, and a system in order to solve the problem.

The present disclosure may be implemented by various schemes including a method, a device (system), a computer program stored in a computer-readable storage medium, and a computer-readable storage medium storing the computer program.

According to an embodiment of the present disclosure, a method of predicting a path of an object in surroundings of a vehicle, the method includes: recognizing, by at least one sensor of the vehicle, the object: generating, by an electronic control device including at least one processor, movement path data associated with the object by tracking, in response to the object being recognized, a movement path of the object during a first time interval; and generating, by the electronic control device and based on the generated movement path data, prediction path data including at least one prediction path associated with the object during a second time interval.

According to an embodiment of the present disclosure, the generating of the prediction path data includes providing, by the electronic control device, the movement path data to a learned artificial neural network model.

According to an embodiment of the present disclosure, the method further includes extracting, by the electronic control device, a road map of a road on which the vehicle is positioned. The generating of the prediction path data includes generating, by the electronic control device, prediction path data based on the movement path data and the road map.

According to an embodiment of the present disclosure, the generating of the prediction path data based on the movement path data and the road map includes determining, by the electronic control device, a first prediction path and a second prediction path through which the object will move by utilizing the movement path data and the road map, and determining, by the electronic control device, a first probability that the object will move through the determined first prediction path and a second probability that the object will move through the determined second prediction path.

According to an embodiment of the present disclosure, the method further includes: determining, by the electronic control device, a driving trajectory of the vehicle during the second time interval: calculating, by the electronic control device and in response to the first probability being equal to or more than a first threshold, a collision risk of the vehicle and the object colliding based on the determined driving trajectory and the first prediction path; and changing, by the electronic control device and in response to the calculated collision risk being equal to or more than a second threshold, the determined driving trajectory.

According to an embodiment of the present disclosure, the method further includes calculating, by the electronic control device, prediction speed data of the object associated with the first prediction path based on the generated prediction path data. The calculating of the collision risk includes calculating, by the electronic control device and in response to the prediction speed data, the collision risk based on a probability that the vehicle and the object will collide with each other in response to the object moving through the first prediction path.

According to an embodiment of the present disclosure, the method further includes transferring, by the electronic control device and in response to a difference between the first probability and the second probability being equal to or less than a third threshold, a control right of the vehicle to a driver of the vehicle.

According to an embodiment of the present disclosure, the extracting of the road map includes determining, by the electronic control device, a current position of the vehicle based on the at least one sensor, and extracting, by the electronic control device, the road map within a predetermined range at the determined current position of the vehicle.

According to an embodiment of the present disclosure, the method further includes: determining, by the electronic control device, a driving trajectory of the vehicle during the second time interval: calculating, by the electronic control device, a collision risk of the vehicle and the object colliding based on the determined driving trajectory and the at least one prediction path: and changing, by the electronic control device, the determined driving trajectory in response to the calculated collision risk being equal to or more than a threshold.

According to an embodiment of the present disclosure, the method further includes classifying, by the electronic control device and in response to the object being recognized, the object into a first type corresponding to a vehicle or a second type corresponding to a pedestrian.

According to an embodiment of the present disclosure, a vehicle system includes: at least one sensor to recognize an object in surroundings of a vehicle; an electronic control device generating movement path data associated with the object by tracking, when the object is recognized, a movement path of the object during a first time interval, and generating prediction path data including at least one prediction path associated with the object during a second time interval based on the generated movement path data to generate a driving trajectory to prevent the vehicle and the object from colliding with each other; and a driving unit driving the vehicle based on the generated driving trajectory when the driving trajectory of the vehicle is generated by the electronic control device.

According to an embodiment of the present disclosure, the electronic control device generates the prediction path data by providing the movement path data to a learned artificial neural network model.

According to an embodiment of the present disclosure, the electronic control device extracts a road map of a road on which the vehicle is positioned, and generates the prediction path data based on the movement path data and the road map.

According to an embodiment of the present disclosure, the electronic control device determines a first prediction path and a second prediction path through which the object will move by using the movement path data and the road map, and determines a first probability that the object will move through the determined first prediction path and a second probability that the object will move through the determined second prediction path.

According to an embodiment of the present disclosure, the electronic control device determines a driving trajectory of the vehicle during the second time interval, calculates a collision risk of the vehicle and the object colliding based on the determined driving trajectory and the first prediction path when the first probability is equal to or more than a first threshold, and changes the determined driving trajectory of the vehicle when the calculated collision risk is equal to or more than a second threshold.

According to an embodiment of the present disclosure, the electronic control device calculates prediction speed data of the object associated with the first prediction path based on the generated prediction path data, and calculates, in response to the prediction speed data, the collision risk based on a probability that the vehicle and the object will collide with each other when the object moves through the first prediction path.

According to an embodiment of the present disclosure, when a difference between the first probability and the second probability is equal to or less than a third threshold, the electronic control device transfers a control right of the vehicle to a driver of the vehicle.

According to an embodiment of the present disclosure, the electronic control device determines a current position of the vehicle based on the at least one sensor, and extracts a road map within a predetermined range at the determined current position of the vehicle.

According to an embodiment of the present disclosure, the electronic control device determines a driving trajectory of the vehicle during the second time interval, calculates the collision risk of the vehicle and the object colliding based on the determined driving trajectory of the vehicle and the at least one prediction path, and changes the determined driving trajectory of the vehicle when the calculated collision risk is equal to or more than a threshold.

According to an embodiment of the present disclosure, the electronic control device classifies, when the object is recognized, the object into a first type corresponding to a vehicle or a second type corresponding to a pedestrian.

In various embodiments of the present disclosure, a vehicle system can control a vehicle to avoid a collision by precisely generating a prediction path based on a past movement path of an object in surroundings of the vehicle.

In various embodiments of the present disclosure, when a downtown (urban) road autonomous driving system is used, which drives the vehicle by a system from a current point to a destination in the city, the vehicle system adaptively changes a driving trajectory of a vehicle according to a predicted future movement of the object to effectively prevent a collision accident.

In various embodiments of the present disclosure, a separate artificial neural network mode is configured according to the type of object, so the vehicle system can more accurately predict the movement of each object.

Advantages of the present disclosure are not limited to the aforementioned effects and other unmentioned advantages will be clearly understood by those (referred to as "normal technicians") skilled in the technical field to which the present disclosure pertains from the description of the claims.

BRIEF DESCRIPTION OF THE DRAWINGS

The embodiments of the present disclosure will be described by reference to the accompanying drawings described below, where the similar reference numerals represent similar elements, but are not limited thereto.

DETAILED DESCRIPTION

Figure 1:
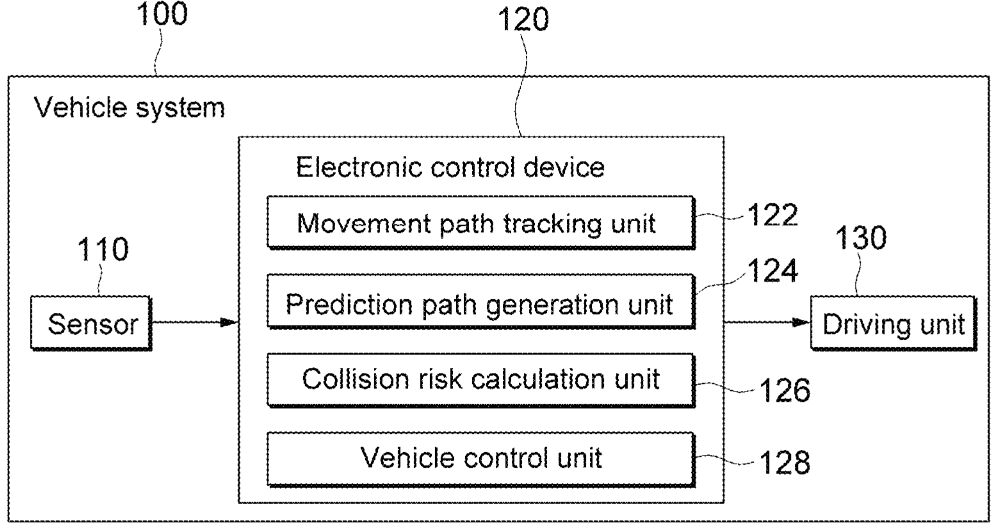
FIG. 1 is a functional block diagram illustrating an internal configuration of a vehicle system according to an embodiment of the present disclosure.

Hereinafter, specific contents for carrying out the present disclosure will be described in detail with reference to the accompanying drawings. However, in the following description, if the gist of the present disclosure may be unnecessarily obscure, the specific description of the well-known functions or configurations will be omitted.

In the accompanying drawings, the same or corresponding component is represented by the same reference numeral. Further, in describing the following exemplary embodiments, redundantly describing the same or corresponding component may be omitted. However, even though the description of the component is omitted, it is not intended that such a component is not included in any exemplary embodiment.

Advantages and features of the disclosed exemplary embodiment of the present disclosure, and methods for accomplishing the same will be more clearly understood from embodiments described below with reference to the accompanying drawings. However, the present disclosure is not limited to an embodiment disclosed below but may be implemented in various different shapes and the embodiments just complete the present disclosure and is provided to completely inform a scope of the present disclosure to those skilled in the art.

Terms used in the present disclosure will be described in brief and the disclosed exemplary embodiment will be described in detail. Terms used in the present disclosure adopt general terms which are currently widely used as possible by considering functions in the present disclosure, but the terms may be changed depending on an intention of those skilled in the art, a precedent, the emergence of new technology, etc. Further, in a specific case, a term which an applicant arbitrarily selects is present and in this case, a meaning of the term will be disclosed in detail in a corresponding description part of the invention. Accordingly, the term used in the present disclosure should be defined based on not just a name of the term but a meaning of the term and contents throughout the present disclosure.

A singular expression in the present disclosure includes a plural expression if there is no clearly singular meaning in the context. Further, the plural expression includes the singular expression if there is no clearly plural meaning in the context. Throughout the present disclosure, unless explicitly described to the contrary, any part including any component may mean that any part may further include another component other than the exclusion of any other component.

In the present disclosure, the terms “include”, “including”, etc., may indicate that features, steps, operations, elements, and/or components are present, but the terms do not exclude addition of one or more other functions, steps, operations, elements, components, and/or a combination thereof.

In the present disclosure, if a specific component is mentioned as “coupled”, “combined”, “connected”, or “reacted” in any other component, the specific component is directly coupled, combined, and/or connected, or reacted to other components, but is not limited thereto. For example, one or more intermediate components may be present between the specific component and another component. Further, in the present disclosure, “and/or” may include one or more respective items listed or at least some combinations of one or more items.

In the present disclosure, the terms “first,” “second,” and the like are used to differentiate one component from other components, but the component is not limited to the term. For example, the “first” component may be the same or similar element as the “second” component.

In the present disclosure, “object” as a dynamic object having a movement may include, for example, a pedestrian, a vehicle (e.g., an other vehicle), etc.

In the present disclosure, “road map” may refer to a network showing a moveable path when the other vehicle or the pedestrian normally moves.

FIG. 1 is a functional block diagram illustrating an internal configuration of a vehicle system 100 according to an embodiment of the present disclosure. As illustrated, the vehicle system 100, which refers to an arbitrary system for controlling or driving a vehicle, may include a sensor 110, an electronic control device 120, and a driving unit 130, but is not limited thereto. Further, it is illustrated that the electronic control device 120 includes a movement path tracking unit 122, a prediction path generation unit 124, a collision risk calculation unit 126, and a vehicle control unit 128, but the present disclosure is not limited thereto.

In order to predict a future path of an object (e.g., a pedestrian and/or other vehicles) and avoid a collision when driving the vehicle, the vehicle system 100 may include at least one sensor 110 for recognizing an object in the surroundings of the vehicle, an electronic control device 120 tracking a current movement path of the object to predict a future movement path, and then generating a driving trajectory so as to prevent the vehicle and the object from colliding with each other, and a driving unit 130 driving, when the driving trajectory of the vehicle is generated by the electronic control device 120, the vehicle based on the generated driving trajectory.

According to an embodiment, the vehicle system 100 may recognize the object based on at least one sensor 110. Here, at least one sensor 110 may include a camera sensor, a radar sensor, and a LiDAR sensor for recognizing the object. That is, the vehicle system 100 may recognize an object such as the pedestrian, other vehicles, etc., around the vehicle based on sensing information obtained using the camera sensor, the radar sensor, and the LiDAR sensor.

When the object is recognized, the vehicle system 100 may track the current movement path of the recognized object in order to predict a future path of the object. For example, the sensor 110 may provide, to the electronic control device 120, sensing information associated with the object during a first time interval (e.g., 3 seconds). In this case, the movement path tracking unit 122 of the electronic control device 120 may generate movement path data including a positional change, a speed, a movement direction, etc., of the object by tracking the movement path of the object based on the sensing information.

When current movement path data of the object is generated by the movement path tracking unit 122 as such, the prediction path generation unit 124 of the electronic control device 120 may generate prediction path data including at least one prediction path associated with the object during a second time interval (a time interval after the first time interval) based on the movement path data. That is, the prediction path generation unit 124 may determine a future position, a movement direction, etc. of the object through a movement of the object during a past specific time interval.

According to an embodiment, the prediction path generation unit 124 may generate prediction path data including at least one prediction path associated with the object by providing the movement path data to a learned artificial neural network model. Here, the artificial neural network model may be a long-short term memory (LSTM) based model for processing time-series data, or a model in which the LSTM and a conventional neural network (CNN) are combined, but is not limited thereto.

According to an embodiment, the prediction path generation unit 124 may generate prediction path data including at least one prediction path associated with the object using the movement path data and a road map. Here, the road map may refer to a network showing a moveable path when the other vehicle or the pedestrian normally moves. For example, when the other vehicle is located in a straight and left turn lane, the road map may include a straight path and a left turn path as a path in which the other vehicle will move. In another example, when there is a crosswalk, the road map may include a path passing through the crosswalk as the path in which the other vehicle will move. That is, the prediction path generation unit 124 tracks a past movement path of the object, and confirms the path in which the object will move through the road map to generate the prediction path of the object more precisely.

Additionally, the prediction path generation unit 124 may determine, when a plurality of prediction path is generated, a probability that the object will move through each path. According to an embodiment, the prediction path generation unit 124 provides the movement path data and the road map to the learned artificial neural network mode to predict path data for the plurality of prediction paths including a first prediction path and a second prediction path and the probability that the object will move through each prediction path. For example, when the other vehicle moves from the straight lane to the left turn lane, the prediction path generation unit 124 may determine that there is a high probability that the vehicle will turn left. In another example, when the moving pedestrian stops in front of the crosswalk, the prediction path generation unit 124 may determine that there is a high probability that the pedestrian will move by passing through the crosswalk.

When the prediction path generation unit 124 determines a probability of moving through at least one prediction path and/or each prediction path, the collision risk calculation unit 126 of the electronic control device 120 may calculate a collision risk between the object and the vehicle based on the prediction path. For example, the collision risk calculation unit 126 may calculate the vehicle and the object based on the probability of colliding with the object which moves through the prediction path when the vehicle moves on the determined driving trajectory.

According to an embodiment, prediction speed data of the object corresponding to the prediction path may be calculated based on the generated prediction path data, and the collision risk calculation unit 126 may calculate the collision risk based on the probability that the vehicle and the object will collide with each other when the object moves through the prediction path in response to the prediction speed data. Here, the collision risk may be calculated based on a predetermined algorithm and/or a machine learning model.

According to an embodiment, the vehicle control unit 128 of the electronic control device 120 may generate or change the driving trajectory of the vehicle, and control the vehicle to follow the generated driving trajectory. For example, the vehicle control unit 128 may generate the driving trajectory of the vehicle and control the vehicle to follow the generated driving trajectory by using the sensing information obtained from the camera sensor, the radar sensor, the LiDAR sensor and/or various values such as a speed, an acceleration, and a yaw rate of the vehicle.

According to an embodiment, the vehicle control unit 128 may control the vehicle to avoid the collision by changing the driving trajectory when the collision risk calculated by the collision risk calculation unit 126 is equal to or more than a predetermined threshold. That is, the vehicle control unit 128 may change the driving trajectory to avoid the collision when it is determined that there is the high possibility that the other vehicle and the pedestrian will collide with each other when the vehicle is driven on the existing driving trajectory.

According to an embodiment, when the plurality of prediction paths including the first prediction path and the second prediction path are determined, and a probability that the object will move through the first prediction path is equal to or more than a first threshold, the vehicle control unit 128 may change the driving trajectory of the vehicle based on whether the calculated collision risk is equal to or more than a second threshold. Additionally, when a difference between the probability that the object will move through the first prediction path and the probability that the object will move through the second prediction path is equal to or less than a third threshold, the vehicle control unit 128 may stop autonomous driving and also transfer the control right of the vehicle to the driver of the vehicle. As such, when the driving trajectory is generated or changed by the vehicle control unit 128, the driving unit 130 may drive the vehicle based on the generated or changed driving trajectory. Further, when the control right is transferred to the driver by the vehicle control unit 128, the driving unit 130 may drive the vehicle according to an operation of the driver.

In FIG. 1, respective functional components included in the vehicle system 100 are separately described, but this is just to assist understanding the present disclosure, and two or more functions may also be performed by one computation device. By such a configuration, the vehicle system 100 may control the vehicle to avoid the collision by precisely generating the prediction path based on a past movement path of the object in the surroundings of the vehicle.

Figure 2:
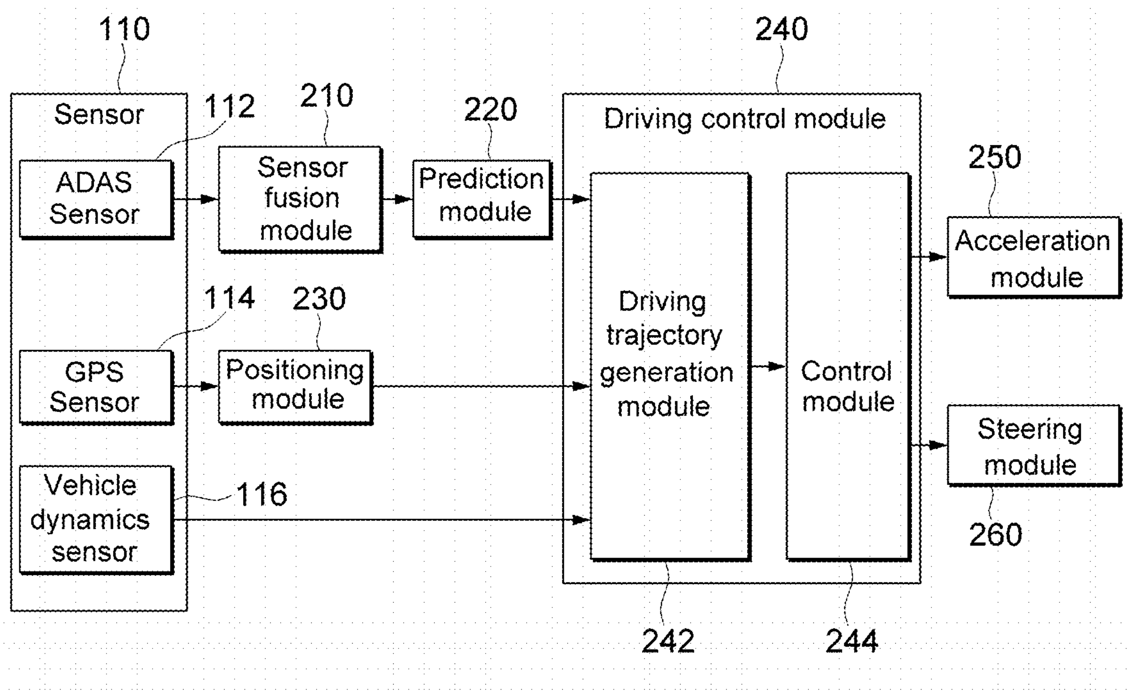
FIG. 2 is an exemplary block diagram illustrating detailed functional configurations of a sensor, an electronic control device, and a driving unit according to an embodiment of the present disclosure.

FIG. 2 is an exemplary block diagram illustrating detailed functional configurations of the sensor 110, the electronic control device 120, and the driving unit 130 according to an embodiment of the present disclosure. As illustrated, the sensor 110 may include an Advanced Driver Assistance System (ADAS) sensor 112, a Global Positioning System (GPS) sensor 114, and a vehicle dynamics sensor 116. Further, the electronic control device (120 of FIG. 1) described above in FIG. 1 may include detailed functional configurations of a sensor fusion module 210, a prediction module 220, a positioning module 230, and a driving control module 240, and the driving unit (130 of FIG. 1) may include detailed functional configurations of an acceleration module 250 and a steering module 260.

According to an embodiment, the ADAS sensor 112 may include the camera sensor, the radar sensor, and the LiDAR sensor for recognizing the object. In this case, camera image data, and radar and LiDAR signal data obtained by respective sensors may be provided to the sensor fusion module 210. When receiving the image data and/or the signal data, the sensor fusion module 210 may correct the received image data and/or signal data, and perform sensor fusion. Here, the sensor fusion may refer to a technology and/or an algorithm that fuses and utilizes a plurality of sensors like one sensor.

As such, the data (sensing information) fused by the sensor fusion module 210 may be provided to the prediction module 220. The prediction module 220 may generate at least one prediction path for the positional change, the movement direction, etc., of the object anticipated during a next time interval based on the received data. For example, when the object is recognized, the prediction module 220 tracks the movement path of the object during a first time interval to generate movement path data associated with the object, and provides the movement path data to the learned artificial neural network model to generate prediction path data including at least one prediction path associated with the object and a probability that the object will move through each prediction path during a second time interval. The generated prediction path data of the object may be provided to the driving control module 240.

According to an embodiment, the GPS sensor 114 may estimate a GPS position associated with a substantial current position of the vehicle under the control of the vehicle system disclosed herein. In this case, a GPS signal estimated by the GPS sensor 114 may be provided to the positioning module 230. The positioning module 230 may estimate a precise position of the vehicle by using the GPS signal. The positioning module 230 may perform precise estimation for a lane on which a current vehicle is positioned, the driving direction of the vehicle, etc., based on the GPS signal by using a predetermined algorithm. Information on the estimated position of the vehicle may be provided to the driving control module 240.

According to an embodiment, the vehicle dynamics sensor 116 as various known sensors, such as a wheel sensor, etc., may refer to a sensor provided in front and rear, and left and right wheels of the vehicle and for sensing the driving speed, the acceleration, and the yaw rate of the vehicle. Additionally, the vehicle dynamics sensor 116 may further include an arbitrary for measuring an acceleration pedal input amount, a vehicle RPM, a brake application amount, a brake maintenance time, etc. That is, the vehicle dynamics sensor 116 may obtain values of various factors, and the obtained dynamics data may be provided to the driving control module 240.

The driving trajectory generation module 242 of the driving control module 240 may generate or change a driving trajectory for avoiding the collision with the object based on the prediction path data and the dynamics data. As described above, the driving control module 240 may calculate the collision risk based on the prediction path and the probability that the object will move through the prediction path, and generate the driving trajectory of the vehicle to avoid the collision when the calculated collision risk is equal to or more than a threshold.

Additionally, the driving trajectory generation module 242 may extract a road map within a predetermined range at the current position of the vehicle based on the information on the position of the vehicle. Then, the driving trajectory generation module 242 may generate or change the driving trajectory for avoiding the collision with the object based on the extracted road map, the prediction path data, and the dynamics data. That is, when the road map is used, a path in which the other vehicle will move may be limited according to a road network, and the driving trajectory generation module 242 determines each limited prediction path and a movement probability for each prediction path to generate or change the driving trajectory for avoiding the collision with the object.

When the driving trajectory for avoiding the collision is generated, the control module 244 may control the acceleration module 250 and the steering module 260 so that the vehicle follows the generated driving trajectory. That is, the control module 244 may calculate an acceleration value, a steering value, etc. for following the driving trajectory, and drive the vehicle by controlling the acceleration module 250 and the steering module 260 based on the calculated values.

By such a configuration, when a downtown (urban) road autonomous driving system is used, which drives the vehicle by a system from a current point to a destination in the city, the vehicle system adaptively changes a driving trajectory of the vehicle according to a predicted future movement of the object to effectively prevent a collision accident.

Figure 3:
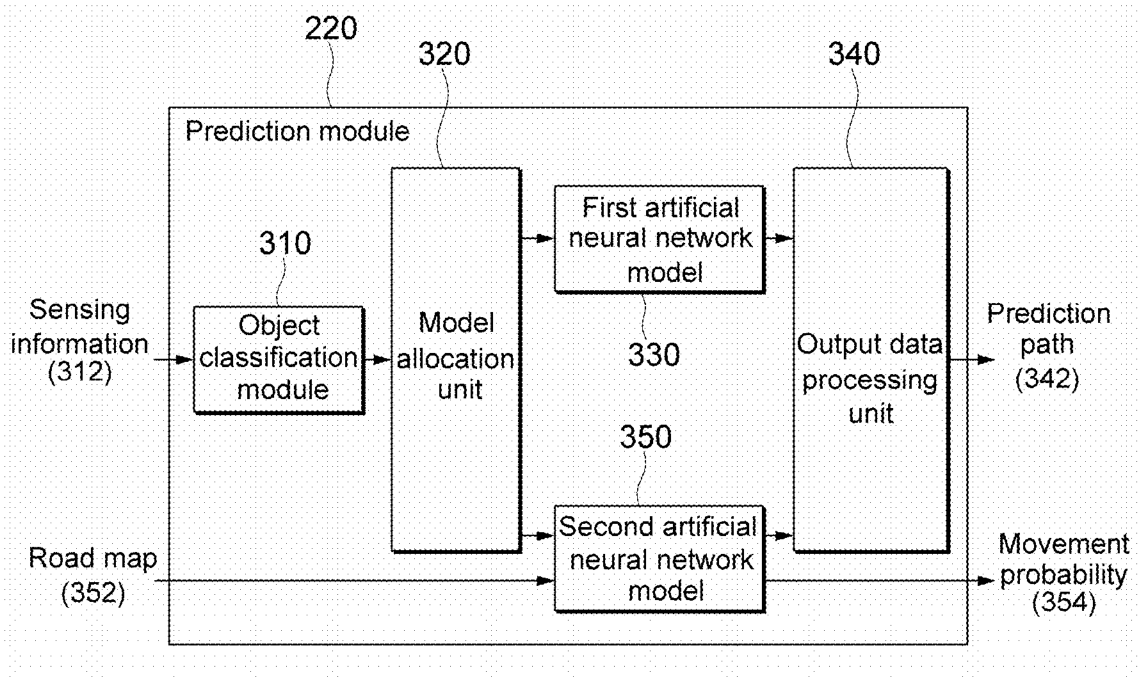
FIG. 3 is an exemplary block diagram illustrating a detailed functional configuration of a prediction module according to an embodiment of the present disclosure.

FIG. 3 is an exemplary block diagram illustrating a detailed functional configuration of a prediction module 220 according to an embodiment of the present disclosure. As illustrated, the prediction module 220 may include an object classification module 310, a model allocation unit 320, a first artificial neural network model 330, a second artificial neural network model 350, an output data processing unit 340, etc., but is not limited thereto.

According to an embodiment, the object classification module 310 may classify the object into a first type corresponding to the other vehicle or a second type corresponding to the pedestrian when the object is recognized based on sensing information 312 obtained by at least one sensor. That is, there is a difference between a scheme in which the pedestrian moves and a scheme in which the vehicle moves, and in order to perform path prediction by considering such a difference, the object classification module 310 may classify the object into the first type or the second type.

When the recognized object is classified into the first object or the second object by the object classification module 310, the model allocation unit 320 may provide movement path data generated by tracking the movement path of the object based on classification information to the first artificial neural network model 330 or the second artificial neural network model 350. For example, when the object is classified into the first type corresponding to the vehicle, the model allocation unit 320 may provide the movement path data to the second artificial neural network model 350. In another example, when the object is classified into the second type corresponding to the pedestrian, the model allocation unit 320 may provide the movement path data to the first artificial neural network model 330. That is, the artificial neural network model may be constituted by a plurality of models to correspond to respective object types.

According to an embodiment, the first artificial neural network model 330 may generate prediction path data including at least one prediction path associated with the object based on the movement path data and provide the generated prediction path data to the output data processing unit 340. Here, the first artificial neural network model 330 may be a model learned to predict a future movement path of the pedestrian based on the movement path data corresponding to the pedestrian.

Additionally, the second artificial neural network model 350 may obtain a road map 352 according to the position of the vehicle, and generate prediction path data including at least one prediction path associated with the object based on the movement path data and the road map 352 and provide the generated prediction path data to the output data processing unit 340. Similarly, the second artificial neural network model 350 may be a model learned to predict a future movement path of the other vehicle based on the movement path data corresponding to the other vehicle. Further, the second artificial neural network model 350 may additionally generate a movement probability 354 of the object corresponding to each prediction path in addition to the prediction path data.

When the output data processing unit 340 receives the prediction path data from the first artificial neural network model 330 and/or the second artificial neural network model 350, the output data processing unit 340 performs preprocessing for the received prediction path data to output a prediction path 342.

In FIG. 3, it is illustrated that the road map 352 is provided to the second artificial neural network model 350, but is not limited thereto, and a separate road map corresponding to the pedestrian may also be provided to the first artificial neural network model 330. By such a configuration, a separate artificial neural network mode is configured according to the type of object, so the vehicle system can more accurately predict the movement of each object.

Figure 4:
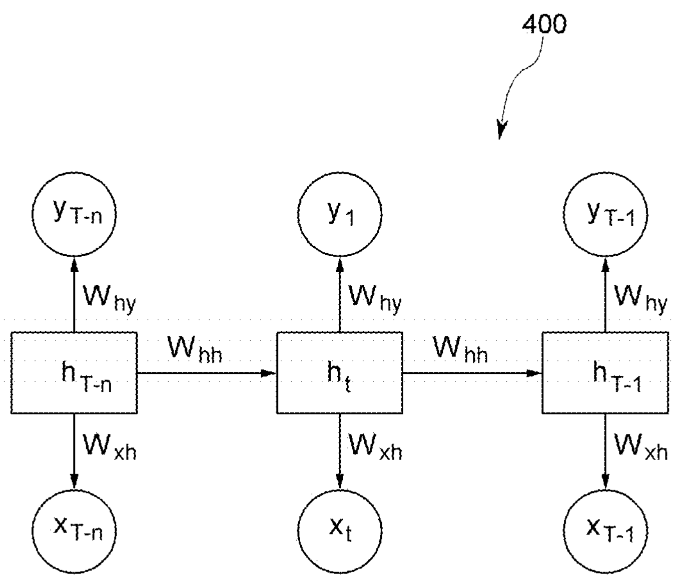
FIG. 4 is an exemplary diagram illustrating an internal configuration of an RNN according to an embodiment of the present disclosure.

FIG. 4 is an exemplary diagram illustrating an internal configuration of a recurrent neural network (RNN) 400 according to an embodiment of the present disclosure. According to an embodiment, the RNN 400 may refer to an artificial neural network model that performs processing for present and/or future information by using past information through a hidden state and a loop structure. That is, the RNN 400 may be an artificial neural network model suitable for processing sequential data. The LSTM may be a kind of the RNN 400. According to an embodiment, a computation in a hidden layer cell of the RNN 400 may be performed by Equation 1 below.

$$h_t = \sigma_h(W_{xh} + W_{hh}h_{t-1} + b_h) \quad \text{[Equation 1]}$$

Here, $h_t$ may represent a hidden state at a time interval t and $h_{t-1}$ may represent a hidden state at a previous time interval. Further, $\sigma_n$ may represent an activation function and $W_{xh}$ may represent a weight matrix for an input of the hidden layer. Further, $W_{hh}$ may represent a continuous hidden state weight matrix and $b_h$ may represent a bias vector for generating the hidden state.

According to an embodiment, an output value of the RNN 400 may be calculated by Equation 2 below.

$$y_t = \sigma_y(W_{hy}h_t + b_y) \quad \text{[Equation 2]}$$

Here, $\sigma_y$ may represent an output layer activation function, $W_{hy}$ may represent a weight matrix between the hidden layer and an output layer, and $b_y$ may represent an output layer bias vector.

Figure 5:
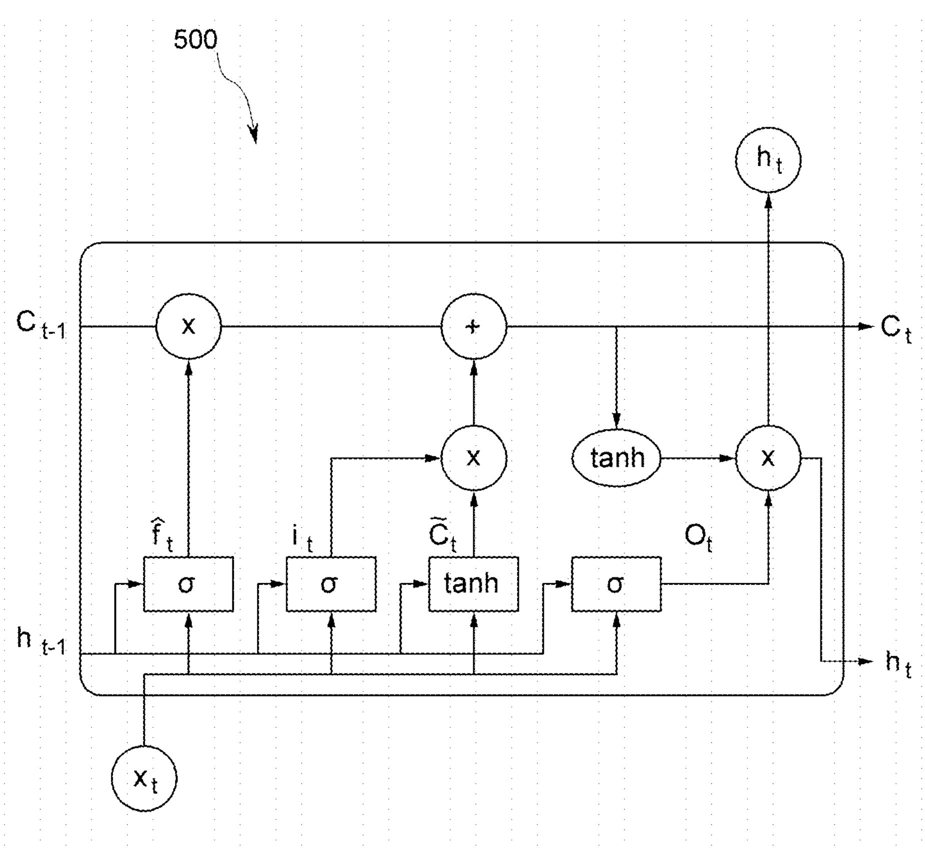
FIG. 5 is an exemplary diagram illustrating an internal configuration of a cell included in LSTM according to an embodiment of the present disclosure.

FIG. 5 is an exemplary diagram illustrating an internal configuration of a cell 500 included in LSTM according to an embodiment of the present disclosure. According to an embodiment, the LSTM may refer to algorithm and/or an artificial neural network model that improves a problem in that a gradient value explosively increases or disappears when a back propagation distance increases in the RNN (400 of FIG. 4). For example, the LSTM may solve a long-term dependency problem of the RNN. Here, the LSTM may be configured to include a plurality of cells (e.g., hidden layer).

According to an embodiment, the LSTM may include a plurality of cells. In an illustrated example, $x_t$ and $h_t$ may represent an input value and an output value of the cell 500 at the time interval t. Further, $C_t$ may represent a cell state of the current cell 500, and $C_{t-1}$ may represent a cell state of a previous cell concatenated with the current cell 500.

According to an embodiment, the cell 500 may include an input gate, a forgetting gate, and an output gate so as to effectively perform learning even when a distance between an input position of previous information and an input position of current information is large. For example, the input gate, the oblivion gate, and the forgetting gate may perform the computation by Equations 3, 4, and 5 below.

$$i_t = \sigma_g(W_iX_t + U_ih_{t-1} + b_i) \quad \text{[Equation 3]}$$

$$f_t = \sigma_g(W_fX_t + U_fh_{t-1} + b_f) \quad \text{[Equation 4]}$$

-continued $$o_t = \sigma_g(W_oX_t + U_oh_{t-1} + b_o) \quad \text{[Equation 5]}$$

Here, $\sigma_g$ as an activation function of a gate may be, for example, a sigmoid function. Further, $W_i$, $W_f$, and $W_o$, and $U_i$, $U_f$, and $U_o$ may represent the weight matrixes, and $b_i$, $b_f$, and $b_o$ may represent the bias vectors. In this case, the output value and the cell state of the cell 500 at the time interval t may be calculated by Equations 6 and 7 below.

$$C_t = f_t * C_{t-1} + i_t * \tilde{C}_t \quad \text{[Equation 6]}$$

$$h_t = o_t * \tanh(C_t) \quad \text{[Equation 7]}$$

Here, $C_t$ may represent the cell state, and $h_t$ may represent the output value of the cell 500. Further, tan h may represent a hyperbolic tangent function.

Figure 6:
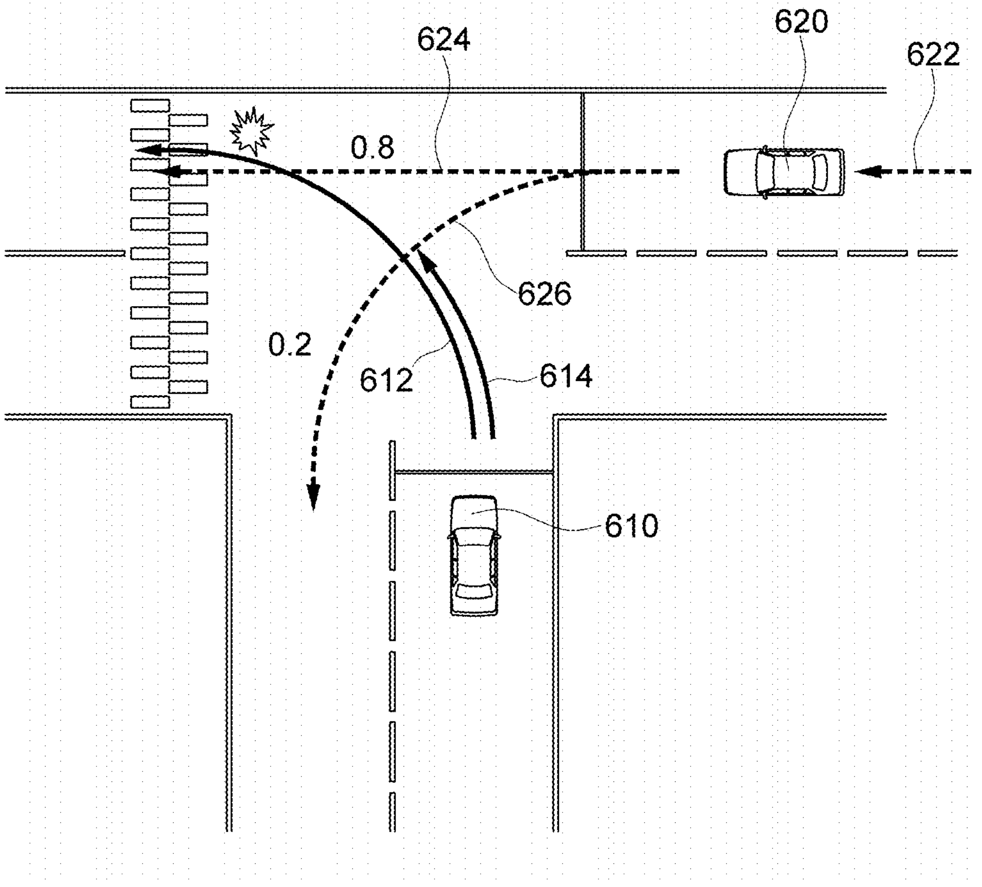
FIG. 6 is a diagram illustrating an example in which a driving trajectory of a vehicle is changed according to an embodiment of the present disclosure.

FIG. 6 is a diagram illustrating an example in which a driving trajectory of a vehicle 610 is changed according to an embodiment of the present disclosure. According to an embodiment, a vehicle system associated with the vehicle 610 may determine a first trajectory 612 representing a driving trajectory on a downtown (urban) road, and control the driving unit so as for the vehicle 610 to follow the first trajectory 612.

In the middle of following the driving trajectory, the vehicle system may recognize an object 620 of the vehicle by using at least one sensor. When the object 620 is recognized, the vehicle system may generate movement path data associated with the object 620 by tracking a movement path 622 of the object 620 during a specific time interval from a recognition time point.

The vehicle system may determine a first prediction path 624 and a second prediction path 626 of the object 620 based on the movement path data and/or the road map. Further, the vehicle system may determine a probability (e.g., 0.8) that the object 620 will move through the determined first prediction path 624 and a probability (e.g., 0.2) that the object 620 will move through the determined second prediction path 626.

According to an embodiment, the vehicle system may calculate a collision risk of the vehicle 610 and the object 620 based on the first trajectory 612 and the first prediction path 624 associated with the object 620 when the probability that the object 620 will move through the first prediction path 624 is equal to or more than a first threshold (e.g., 0.7). For example, the vehicle system may calculate prediction speed data of the object 620 corresponding to the first prediction path 624 based on the generated prediction path data, and calculate the collision risk based on a probability that the vehicle 610 and the object 620 will collide with each other when the object 620 moves through the first prediction path 624 in response to the prediction speed data. Then, the vehicle system may generate a second trajectory 614 by changing the determined driving trajectory of the vehicle 610 when the calculated collision risk is equal to or more than a second threshold. In this case, the vehicle system allows the vehicle 610 to be driven on the second trajectory 614 to avoid the collision between the vehicle 610 and the object 620.

Figure 7:
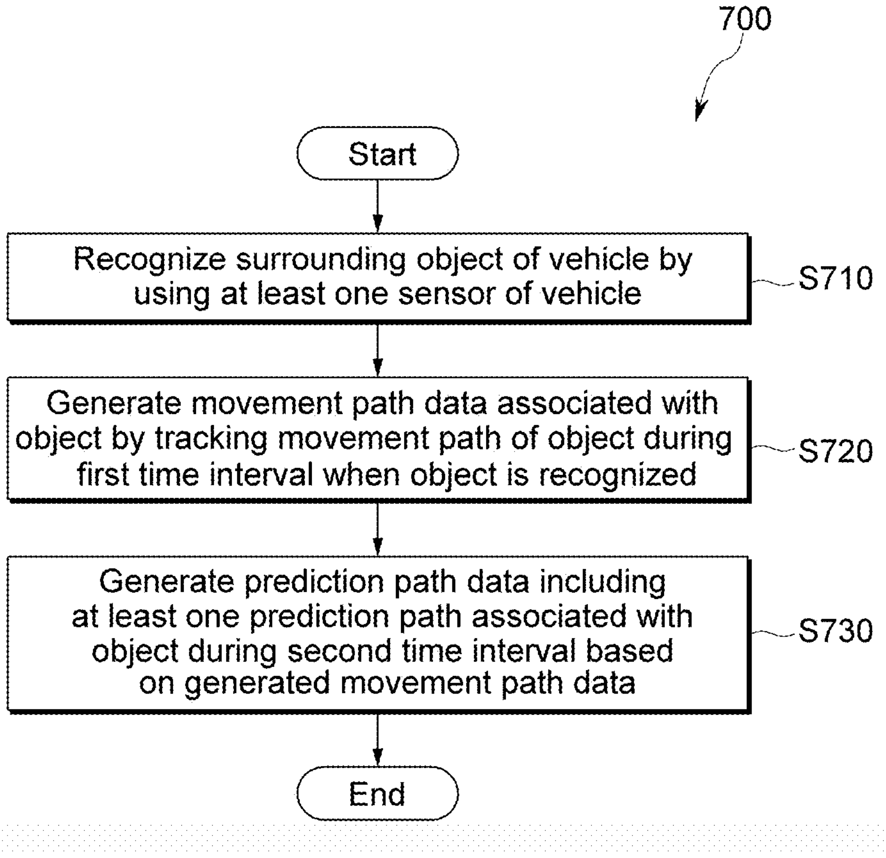
FIG. 7 is a flowchart illustrating a method for predicting a path of an object according to an embodiment of the present disclosure.

FIG. 7 is a flowchart illustrating a method 700 for predicting a path of an object according to an embodiment of the present disclosure. The method 700 for predicting a path of an object may be performed by at least one processor (e.g. at least one processor of a vehicle system). The method 700 for predicting a path of an object may be initiated by recognizing the object by using at least one processor by the processor (S710). The processor may generate movement path data associated with the object by tracking a movement path of the object during a first time interval when the object is recognized (S720).

The processor may generate prediction path data including at least one prediction path associated with the object during a second time interval based on the generated movement path data (S730). For example, the processor may generate prediction path data including at least one prediction path associated with the object by providing the movement path data to a learned artificial neural network model.

Additionally or alternatively, the processor may extract a road map of a road on which the vehicle is positioned, and also generate prediction path data including at least one prediction path associated with the object based on the movement path data and the road map. For example, the processor may determine a current position of the vehicle based on at least one sensor, and extract a road map within a predetermined range at the determined current position of the vehicle. That is, the processor may determine a first prediction path and a second prediction path through which the object will move by using the movement path data and the road map, and determine a probability that the object will move through the determined first prediction path and a probability that the object will move through the determined second prediction path.

In this case, the processor may determine or calculate a driving trajectory during the second time interval of the vehicle, and calculate a collision risk of the vehicle and the object based on the driving trajectory of the vehicle and the first prediction path associated with the object when the probability that the object will move through the first prediction path is equal to or more than a first threshold. For example, the processor may calculate prediction speed data of the object corresponding to the first prediction path based on the generated prediction path data, and calculate the collision risk based on a probability that the vehicle and the object will collide with each other when the object moves through the first prediction path in response to the prediction speed data. Then, the processor may change the determined driving trajectory of the vehicle when the calculated collision risk is equal to or more than a second threshold.

Additionally or alternatively, when a difference between the probability that the object will move through the first prediction path and the probability that the object will move through the second prediction path is equal to or less than a third threshold, the processor may transfer a control right of the vehicle to a driver of the vehicle. That is, when it is not clear whether the object moves through the first prediction path or the second prediction path, the processor may stop autonomous driving, and transfer the control right of the vehicle to the driver.

The method, various embodiments, and/or units and modules disclosed herein may be implemented by a digital electronic circuit, computer hardware, firmware, software, and/or a combination thereof. Various embodiments of the present disclosure may be executed by a data processing device, e.g., one or more programmable processors and/or one or more computing devices, or implemented by a computer-readable storage medium or a computer program stored in the computer-readable storage medium. The computer program described above may be written in any form of programming language, including compiled language or interpreted language, and may be distributed in any form of independent executable program, module, and subroutine. The computer program may be distributed through one computing device, a plurality of computing devices that are connected through the same network, and/or a plurality of computing devices distributed to be connected through a plurality of different networks.

The method and/or various exemplary embodiments may be performed by one or more processors configured to operate based on the input data or execute one or more computer programs processing, storing, and/or managing a predetermined function, a predetermined function, etc., by generating the output data. For example, the method and/or various exemplary embodiments of the present disclosure may be performed by a special-purpose logic circuit such as a field programmable gate array (FPGA) or application specific integrated circuit (ASIC), and an apparatus and/or a system for performing the method and/or exemplary embodiments of the present disclosure may be implemented as the special-purpose logic circuit such as the FPGA or ASIC.

One or more processor executing the computing program may include a universal-purpose or special-purpose microprocessor and/or one or more processors of a predetermined type of digital computing device. The processor may receive a command and/or data from each of a read dedicated memory and a random access memory or receive the instruction and/or data from the read dedicated memory and the random access memory. In the present disclosure, components of the computing device performing the method and/or exemplary embodiments may include one or more processors for executing the instructions, and one or more memory devices for storing the instructions and/or data.

According to an embodiment, the computing device may send and receive data to and from one or more mass storage devices for storing data. For example the computing device may receive data from a magnetic disc or an optical disc and/or transmit data to the magnetic disc or the optical disc. A computer readable storage medium suitable for storing the commands and/or data associated with the computer program may include a predetermined type of non-volatile memory including semiconductor memory devices such as an Erasable Programmable Read-Only Memory (EPROM), an Electrically Erasable PROM (EEPROM), a flash memory device, etc., but the present disclosure is not limited thereto. For example, the computer readable storage medium may include a magnetic disc such as an internal hard disc or a mobile disc, a magneto-optic disc, a CD-ROM disc, and a DVD-ROM disc.

To provide an interaction with the user, the computing device has a display device (e.g., a cathode ray tube (CRT), a liquid crystal display (LCD), etc.) for providing or displaying information to the user, and a pointing device (e.g., a keyboard, a mouse, a trackball, etc.) for the user to provide an input and/or an instruction on the computing device, but is not limited thereto. That is, the computing device may further include other arbitrary types of devices for providing the interaction with the user. For example, for the interaction with the user, the computing device may provide an arbitrary type of sense feedback including a visual feedback, an auditory feedback, and/or a tactile feedback. In this regard, the user may provide the input to the computing device through various gestures such as visuals, voices, and operations.

In the present disclosure, various exemplary embodiments may be implemented in a computing system including a backend component (e.g., a data server), a middleware component (e.g., an application server), and/or a frontend component. In this case, the components may be interconnected by a predetermined form or medium of digital data communications such as a communication network. For example, the communication network may be a (Local Area Network (LAN), a Wide Area Network (WAN), etc.

The computing device based on the embodiments described in the present disclosure may be implemented by using hardware and/or software configured to interact with the user, which includes a user device, a user interface (UI) device, a user terminal, or a client device. For example, the computing device may include a hand-held computing device such as a laptop computer. Additionally or alternatively, the computing device may include a Personal Digital Assistants (PDA), a tablet PC, a game console, a wearable device, an Internet of things (IOT) device, a virtual reality (VR) device, an augmented reality (AR) device, etc., but the present disclosure is not limited thereto. The computing device may further include another type of device configured to interact with the user. Further, the computing device may include a hand-held communication device (e.g., a mobile phone, a smart phone, a wireless cellular phone, etc.) suitable for wireless communication through a network such as a mobile communication network, etc. The computing device may be configured to wirelessly communicate with a network server by using wireless communication technologies such as a radio frequency (RF), a microwave frequency (MWF), and an infrared ray frequency (IRF) and/or protocols.

In the present disclosure, various exemplary embodiments including specific structural and functional details are exemplary. Thus, the embodiments of the present disclosure are not limited to the above and can be implemented in several different forms. In addition, the terms used in the present disclosure are intended to explain some exemplary embodiments and are not interpreted as limiting the embodiment. For example, a singular word and the above may include a plurality type as long as it is not clearly represented in context.

In the present disclosure, if it is not contrarily defined, all terms used in the present disclosure including technological or scientific terms have the same meanings as those generally understood by a person with ordinary skill in the art to which such a concept belongs. Further, generally used terms such as terms defined in a dictionary should be interpreted to have a meaning which coincides with a meaning in a context of related art.

In the present disclosure, the present disclosure is described in relation to some embodiments, but various modifications and changes can be made within the scope without departing from the scope of the present disclosure that can be understood by those skilled in the art in the present disclosure. Further, the modifications and the changes should be regarded to be included in the appended claims of the present disclosure.

What is claimed is:

1. A method of predicting a path of an object in surroundings of a vehicle, the method comprising:

recognizing, by at least one sensor of the vehicle, the object;

generating, by an electronic control device including at least one processor, movement path data associated with the object by tracking, in response to the object being recognized, a movement path of the object during a first time interval and classifying the object into a first type corresponding to a vehicle or a second type corresponding to a pedestrian;

extracting, by the electronic control device, a road map of a road on which the vehicle is positioned; and generating, by the electronic control device and based on the generated movement path data and the road map, prediction path data including at least one prediction path associated with the object during a second time interval, wherein the generating of the prediction path data comprises:

when the object is classified into the first type, generating, by the electronic control device, the prediction path data using a second artificial neural network model trained to generate the prediction path data for the vehicle; and when the object is classified into the second type, generating, by the electronic control device, the prediction path data using a first artificial neural network model trained to generate the prediction path data for the pedestrian, wherein the generating of the prediction path data comprises:

determining, by the electronic control device, a first prediction path and a second prediction path through which the object is expected to move by utilizing the movement path data and the road map; and determining, by the electronic control device, a first probability that the object is expected to move through the determined first prediction path and a second probability that the object is expected to move through the determined second prediction path, wherein the generating of the prediction path data further comprises generating, by the electronic control device, the prediction path data by providing the movement path data to the first artificial neural network model or the second artificial neural network model, and wherein the generating of the prediction path data further comprises:

when the object is classified into the first type, generating, by the electronic control device, the prediction path data by providing the movement path data and the road map to the second artificial neural network model; and when the object is classified into the second type, generating, by the electronic control device, the prediction path data by providing the movement path data to the first artificial neural network model.

2. The method of claim 1, further comprising:

determining, by the electronic control device, a driving trajectory of the vehicle during the second time interval;

calculating, by the electronic control device and in response to the first probability being equal to or more than a first threshold, a collision risk of the vehicle and the object colliding based on the determined driving trajectory and the first prediction path; and changing, by the electronic control device and in response to the calculated collision risk being equal to or more than a second threshold, the determined driving trajectory.

3. The method of claim 2, further comprising:

calculating, by the electronic control device, prediction speed data of the object associated with the first prediction path based on the generated prediction path data, wherein the calculating of the collision risk comprises calculating, by the electronic control device and in response to the prediction speed data, the collision risk based on a probability that the vehicle and the object are expected to collide with each other in response to the object moving through the first prediction path.

4. The method of claim 1, further comprising:

transferring, by the electronic control device and in response to a difference between the first probability and the second probability being equal to or less than a third threshold, a control right of the vehicle to a driver of the vehicle.

5. The method of claim 1, wherein the extracting of the road map comprises determining, by the electronic control device, a current position of the vehicle based on the at least one sensor; and extracting, by the electronic control device, the road map within a predetermined range at the determined current position of the vehicle.

6. The method of claim 1, further comprising:

determining, by the electronic control device, a driving trajectory of the vehicle during the second time interval;

calculating, by the electronic control device, a collision risk of the vehicle and the object colliding based on the determined driving trajectory and the at least one prediction path; and changing, by the electronic control device, the determined driving trajectory in response to the calculated collision risk being equal to or more than a threshold.

7. A vehicle system comprising:

at least one sensor configured to recognize an object in surroundings of a vehicle;

an electronic control device configured to generate movement path data associated with the object by tracking, when the object is recognized, a movement path of the object during a first time interval, classifying the object into a first type corresponding to a vehicle or a second type corresponding to a pedestrian, and generating prediction path data including at least one prediction path associated with the object during a second time interval based on the generated movement path data to generate a driving trajectory to prevent the vehicle and the object from colliding with each other; and a driving unit configured to drive the vehicle based on the generated driving trajectory when the driving trajectory of the vehicle is generated by the electronic control device, wherein the electronic control device is configured to:

when the object is classified into the first type, generate the prediction path data using a second artificial neural network model trained to generate the prediction path data for a vehicle; and when the object is classified into the second type, generate the prediction path data using a first artificial neural network model trained to generate the prediction path data for a pedestrian, wherein the electronic control device is configured to:

extract a road map of a road on which the vehicle is positioned;

generate the prediction path data based on the movement path data and the road map;

determine a first prediction path and a second prediction path through which the object is expected to move by using the movement path data and the road map; and determine a first probability that the object is expected to move through the determined first prediction path and a second probability that the object is expected to move through the determined second prediction path, wherein the electronic control device is further configured to generate the prediction path data by providing the movement path data to the first artificial neural network model or the second artificial neural network model, and wherein the electronic control device is configured to:

generate the prediction path data by providing the movement path data and the road map to the second artificial neural network model when the object is classified into the first type; and generate the prediction path data by providing the movement path data to the first artificial neural network model when the object is classified into the second type.

8. The vehicle system of claim 7, wherein the electronic control device is configured to determine a driving trajectory of the vehicle during the second time interval, calculate a collision risk of the vehicle and the object colliding based on the determined driving trajectory and the first prediction path when the first probability is equal to or more than a first threshold, and change the determined driving trajectory when the calculated risk is equal to or more than a second threshold.

9. The vehicle system of claim 8, wherein the electronic control device is configured to calculate prediction speed data of the object associated with the first prediction path based on the generated prediction path data, and calculate, in response to the prediction speed data, the collision risk based on a probability that the vehicle and the object are expected to collide with each other when the object moves through the first prediction path.

10. The vehicle system of claim 7, wherein when a difference between the first probability and the second probability is equal to or less than a third threshold, the electronic control device is configured to transfer a control right of the vehicle to a driver of the vehicle.

11. The vehicle system of claim 7, wherein the electronic control device is configured to determine a current position of the vehicle based on the at least one sensor, and extract a road map within a predetermined range at the determined current position of the vehicle.

12. The vehicle system of claim 7, wherein the electronic control device is configured to determine a driving trajectory of the vehicle during the second time interval, calculate the collision risk of the vehicle and the object colliding based on the determined driving trajectory of the vehicle and the at least one prediction path, and change the determined driving trajectory of the vehicle when the calculated collision risk is equal to or more than a threshold.

* * * * *